United States Patent
Grosseau

[15] 3,674,285
[45] July 4, 1972

[54] VEHICLE SUSPENSION

[72] Inventor: Albert Grosseau, Chaville, France

[73] Assignee: Citroen S.A. (Automobiles Citroen, Berliet, Panhard), Paris, France

[22] Filed: July 8, 1969

[21] Appl. No.: 839,947

[30] Foreign Application Priority Data

July 9, 1969 France ............................... 69158551

[52] U.S. Cl. ............................ 280/124 R, 267/21, 280/96.2
[51] Int. Cl. ................................................................ B60g 3/14
[58] Field of Search .................. 280/124, 124.3; 180/73 TL, 180/73 TT, 73; 267/21

[56] References Cited

UNITED STATES PATENTS 2,887,310  5/1959  Muller ............................... 280/124 X
3,174,771  3/1965  Muller ............................... 280/124

*Primary Examiner*—A. Harry Levy
*Attorney*—Fleit, Gipple & Jacobson

[57] ABSTRACT

A suspension for a vehicle, which suspension includes a pendulum member upon which the wheel of the vehicle is mounted and which, in turn, is connected to a vertically oscillating suspension element on a pivot arranged transversely lower than the axis of the wheel. A stop is provided between the suspension element and the pendulum member to limit angular displacement of the pendulum member about its pivot, the stop being elastic in character and comprised of a material having elastic properties with the pivot of the suspension element being arranged on the inside of the bearing comprised by the elastic stop.

4 Claims, 9 Drawing Figures

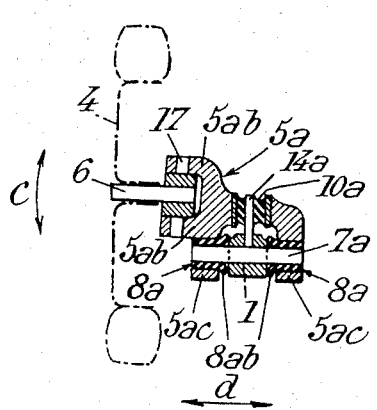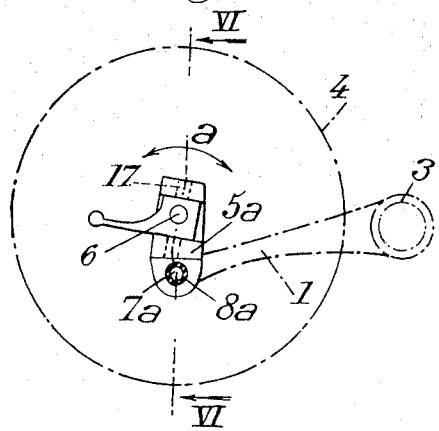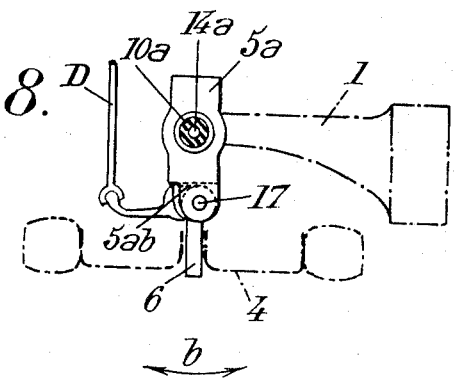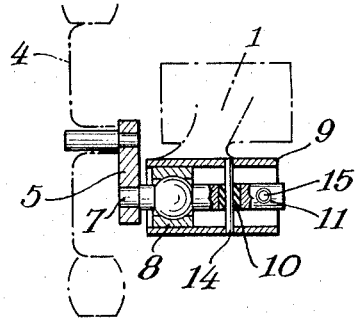

VEHICLE SUSPENSION

BACKGROUND AND SUMMARY OF THE INVENTION

The present invention relates to vehicle suspensions of the type which comprise on each side of the vehicle a pendulum member bearing the wheel and connected to a vertical oscillation suspension element by a pivot arranged transversely below the axis of the wheel and in which elastic stops are provided between the suspension element and the pendulum member to limit the angular displacements of the latter around its pivot. More particularly, since this would seem to be the area of greatest interest, the invention concerns an improvement especially to those suspensions in which the vertical oscillation suspension element consists of a longitudinal arm articulated on the body or frame of the vehicle by a second pivot parallel to that of the pendulum member.

It is known that the longitudinal oscillations of the wheel thus suspended, which are due to the oscillations of the pendulum member around a transverse pivotal axis, to one side or the other of a stable position of equilibrium wherein the axis of the wheel is vertical to the pivot of said member, have the effect of attenuating the rolling noises and the impacts transmitted to the body by the suspension members.

The object of the present invention is, in particular, to make this type of suspension responds better than prior art constructions to the various requirements of actual practice, especially with regard to the comfort and silence of a vehicle travelling on uneven ground.

For this purpose, the suspension defined above is characterized, in accordance with the invention, by the fact that the pivot of the pendulum member is arranged inside at least one bearing of an elastomeric or semi-elastic material, the elastic stops being adapted not only to limit the angular displacements of the pendulum member, but also to contribute to maintaining the pivot axis of the latter in a substantially invariable position with respect to the suspension element.

BRIEF DESCRIPTION OF THE DRAWINGS

In any event, the invention will be better understood from the following description, as well as from the accompanying drawings, which description and drawings relate to three preferred embodiments.

FIGS. 6, 7, and 8 show a suspension which has been constructed in accordance with a second embodiment of the invention and include a view in vertical section along the line VI—VI of FIG. 7, a view in elevation, and a plan view, respectively;

FIG. 9 shows a third embodiment of the invention.

In the various Figures of the drawing similar numerals denote corresponding elements.

DETAILED DESCRIPTION

Figure 1:
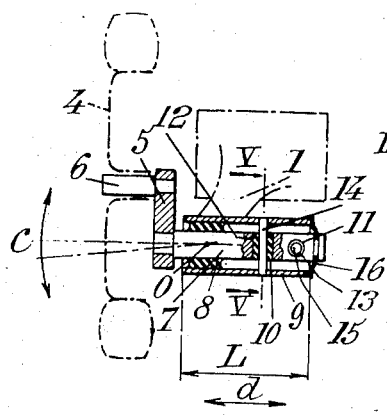
FIGS. 1, 2, and 3 of these drawings show a suspension constructed in accordance with a first embodiment and include a view in partial vertical section along line I—I of FIG. 2, a view in elevation and a view in horizontal section along the line III—III of FIG. 2, respectively.

Before entering into the heart of the matter, it will be useful to point out that, when an automobile moves over uneven ground, the wheels undergo horizontal shocks which are not damped by the vertical suspension. These horizontal shocks are transmitted to the frame and to the body of the vehicle, and this results, in particular, in vibrations and driving noises which are unpleasant for the passengers. It is known that, in order to decrease these driving noises and increase the comfort of the vehicle, it is sufficient to permit a slight longitudinal oscillation of the wheel (that is to say, an oscillation parallel to the direction of travel), but that it is necessary to limit to the greatest extent possible all the other displacements which might affect the road-keeping qualities of this vehicle and, in particular, to modify the track-width, the toe-in (or toe-out), and the camber of the vehicle. One thus provides the vehicle, so to say, with a "horizontal" suspension which, by analogy with the vertical suspension, permits the wheels to oscillate longitudinally so as to absorb the horizontal impacts due to travel.

For this purpose, the suspension is provided on each side of the vehicle with a pendulum member 5 or 5a which bears the wheel 4 and is connected to a vertical oscillation suspension element by a pivot 7 or 7a arranged transversely lower than the axis of the wheel 4, and elastic stops are provided between the suspension element and the pendulum member 5 or 5a to limit the angular displacements of the latter around its pivot 7 or 7a.

In accordance with the embodiments shown, the suspension element consists of a longitudinal arm 1 which is connected to the frame A by an elastic device 2 adapted, in turn, to transmit the suspended load and which can oscillate around a transverse shaft 3 rigidly connected to the frame. The wheel 4 is mounted on the member 5 or 5a via a spindle 6 which is fastened either rigidly or for rotation (in the case of the drive wheel), and can possibly pivot around a substantially vertical axis (in the case of a steering wheel). The spindle 6 has its axis located approximately in a horizontal plane parallel to the pivot 7. The spindle 6 and the pivot 7 are placed on opposite sides of the member 5.

In accordance with the invention, the pivot 7 or 7a is arranged inside an elastic bearing 8 (FIGS. 1-3) or of two bearings 8a (FIGS. 6-8) of an elastomeric or semi-elastic material, and elastic stops are arranged not only to limit the angular displacements of the pendulum member 5 or 5a, but also to contribute to maintaining the pivot axis of the latter in a substantially invariable position with respect to the arm 1.

Figure 2:
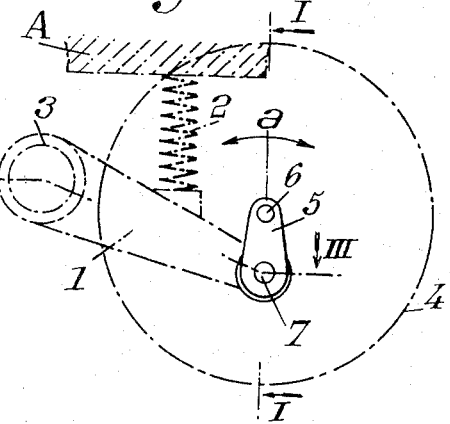
Figure 3:
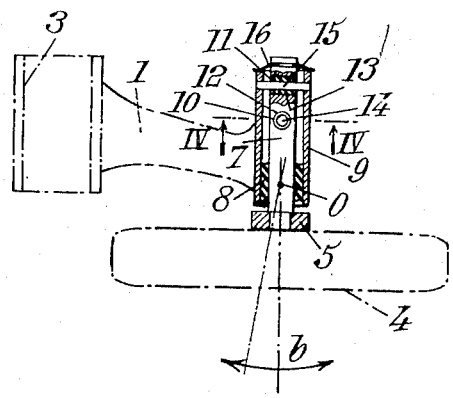

In accordance with the embodiment of FIGS. 1-3, a flexible connection is effected between the pivot 7, which is rigidly connected to the pendulum member 5, and the suspension arm 1. For this purpose, the pivot 7, consisting of a cylindrical part of revolution, is housed coaxially in a rigid cylindrical sleeve 9 coaxial with the pivot 7 and rigidly fixed to the suspension arm 1. In this case, the elastic bearing 8 is advantageously formed of a rubber sleeve which is bonded to two metal sleeves (not shown), one outside the rubber sleeve and clamped in the rigid sleeve 9 and the other inside the rubber sleeve and clamping the pivot 7. The bearing 8 is placed at the end of the rigid sleeve 9 closest to the wheel 4.

The elastic stops are also formed of at least two cylindrical sleeves 10 and 11 of elastomer. On the one hand, these sleeves 10 and 11 are arranged in cylindrical holes 12 and 13 drilled in the part of the pivot 7 located on the inside of the rigid sleeve 9, but on the outside of the bearing 8; the axes of the holes which are staggered with respect to each other are normal with respect to each other when there are two of them, one, for instance, being horizontal and the other vertical, and they intersect the axis of the pivot 7 at the right angle. On the other hand, these stops constitute a liner around cylindrical rods 14 and 15 which are coaxial with the holes 12 and 13 and rigidly connected to the rigid sleeve 9. Each of the stops 10 and 11 can advantageously be formed, as already described in the case of the bearing 8, of a rubber sleeve bonded to two metal sleeves (not shown), one of which, the outer one, is in contact with the pivot 7, while the other, the inner one, is in contact with the rod 14 or 15. Instead of arranging the elastic stops between the pivot 7 and the rods 14 and 15, one could arrange them between the rods 14 and 15 and the rigid sleeve 9, the rods 14 and 15 in this case being rigidly connected to the pivot 7 (and not the sleeve 9). The rigid sleeve 9 is advantageously given a length L at least equal to 120 mm to allow a sufficiently long bearing 8 and be able to space the rods 14 and 15 sufficiently away from said bearing. The center of the bearing 8 can be considered to constitute an articulation point 0; the lever arms represented by the distances from the rods 14 and 15 to the point 0 are then sufficient to prevent the pivot 7 from tilting around the point 0.

In order to protect the parts arranged within the rigid sleeve 9, there can be placed on the free end of the sleeve 9 farthest away from the wheel 4 a flexible plug 16, for instance of elastomer, which closes the annular space between the pivot 7 and the rigid sleeve 9 and prevents the entrance of any external foreign body.

In accordance with the second embodiment shown in FIGS. 6–8, a flexible connection is provided, this time between pendulum member 5a and pivot 7a, which is rigidly connected to suspension arm 1. FIGS. 6, 7, and 8 relate more particularly to the suspension of a steering wheel 4 controlled by a steering bar D, preferably parallel to the transverse pivoting axis.

In this embodiment, the pendulum member consists of part 5a obtained by joining together two non-secant U-shaped forks having the same central plane and arranged in such a manner that the flanges of the U's are substantially normal to the sides of a right angle and that the concavities of the U's are oriented towards the outside of the right angle. The horizontal flanges 5ab of the first fork are pierced in a substantially vertical direction to receive a pin 17 around which the spindle 6 of the steering wheel 4 pivots. The vertical flanges 5ac of the second fork are pierced in a substantially horizontal direction to receive the pivot 7a around which the pendulum member 5a oscillates, the pivot 7a being rigidly connected to the suspension arm 1 which terminates between the flanges 5ac. Two elastic bearings 8a are arranged in the holes pierced in the flanges 5ac and assure a flexible connection between the flanges 5ac and the pivot 7a. These elastic bearings extend towards the inside of the flanges 5ac to constitute transverse stops 8ab between the suspension arm 1 and the pendulum member 5a. Another stop, intended in particular to limit the longitudinal oscillations of the wheel, consists of an elastic cylindrical sleeve 10a with vertical axis housed in the pendulum member 5a and surrounding a vertical rod 14a which is rigidly connected to the suspension arm 1.

As a result of these constructions, there is obtained an improved automobile suspension, the operation of which will first of all be described with reference to the first embodiment of FIGS. 1–3.

As a result of the arrangement of the pivot 7 below the spindle 6, under the effect of the weight of the vehicle and the reaction of the ground, the axes of the spindle 6 and the pivot 7 tend to move in one and the same vertical plane. The equilibrium position is stable, and any deviation from it gives rise to a return torque toward said position.

Figure 5:
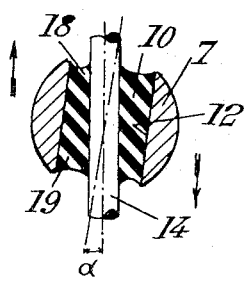

When the wheel 4 is subjected to a horizontal shock which acts parallel to the direction of displacement of the vehicle, this shock, transmitted to the spindle 6, produces a moment of rotation which tends to turn the pivot 7 around its axis, as indicated by the double-ended arrow a, FIG. 2. The elastic bearing 8 opposes this moment of rotation with only a small moment of resistance, but, on the other hand, the elastic stops 10 and 11 oppose with a substantial moment of resistance due to their manner of operation indicated schematically by arrows in FIG. 5. As the pivot 7 turns through a small angle α around its axis with respect to the rigid sleeve 9, the axis of the bore 12 drilled in the pivot 7 also turns through an angle α, FIG. 5, with respect to the axis of the rod 14 which is rigidly connected to the sleeve 9. The result is a deformation of the sleeve 10 such that, on one and the same generatrix of this sleeve, one end 18 is compressed, while the other end 19 is tensioned. This manner of operation of the elastic sleeves is called "conic" working. The two elastic stops 10 and 11 which are thus deformed offer a progressive moment of resistance which, while permitting a certain longitudinal oscillation of the wheel 4, limits it to values which are relatively low but which permit a dampening of the horizontal impacts. The spindle 6 describes, in fact, a small circular arc which may be assimilated to its tangent, parallel to the ground, and the oscillation can be considered linear.

Figure 4:
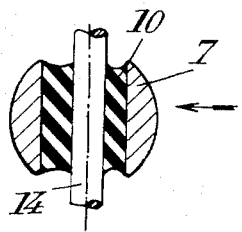
FIGS. 4 and 5 illustrate schematically views in section along the line IV—IV of FIG. 3 and V—V of FIG. 1, respectively, showing two different manners of operation of the elastic stops.

With regard to the oscillations of the wheel 4 as indicated by the double-ended arrow b, FIG. 3, and which correspond to variations in toe-in, it is seen that the bearing 8 and the elastic stop 10 operate in compression. This manner of operation is represented in FIG. 4 (where the direction of the forces is indicated schematically by an arrow), and it appears that all the points of one and the same generatrix are either compressed or tensioned. As the elastic or semi-elastic materials used, in particular, rubber, offer good resistance to compression, and as the distance and, therefore, the lever arm between bearing 8 and stop 10 are large, the resistant torque produced by the stop 10 and the bearing 8, which are compressed, is substantial, and the oscillations in the direction indicated by the double-ended arrow b, FIG. 3, are negligible.

Likewise, the oscillations in the direction of the double-ended arrow c, FIG. 1, which correspond to variations in camber, are negligible, since the bearing 8 and the stop 11 work in compression and oppose a high resistance.

Finally, from consideration of the transverse displacements along the double-ended arrow d, FIG. 1, it is seen that the elastic stops 10 and 11 both work in compression and, therefore, oppose a high resistance. The variations in tread resulting from such displacements can only be negligible.

The explanation of the operation of the embodiment of FIGS. 6, 7, and 8 is similar to that given above.

The longitudinal oscillations of the wheel 4 in the direction of the double-ended arrow a, FIG. 7, are essentially limited by the elastic sleeve 10a which works in compression.

The oscillations of the wheel 4 along the double-ended arrows b and c, FIGS. 8 and 6, are made negligible by the resistance of the elastic bearings 8a which are spaced apart from each other and operated in compression.

The lateral displacements along the double-ended arrow d, FIG. 6, are also negligible, since the elastic stops 8ab and 10a work in compression.

Thus, in this second embodiment, as in the first, only the longitudinal oscillations can assume a non-negligible amplitude which makes it possible to absorb the horizontal impacts. One can, furthermore, form the elastic sleeve 10a asymmetrically so as to impart it a slight flexibility in transverse direction to reduce the oscillations d corresponding to variations in tread and a substantial flexibility in longitudinal direction to permit limited longitudinal oscillations. This asymmetry is obtained, for instance, by pockets judiciously arranged within the said sleeve. This remark also applies to the stops 10 and 11 of the first embodiment. In both cases, the elastic sleeves 10, 11 or 10a not only limit the angular displacements of the pendulum member 5 or 5a, but also contribute to maintaining the pivot axis of the latter in substantially invariable position with respect to the suspension arm.

Thus, both of the latter embodiments permit the wheel to oscillate longitudinally without the toe-in, the track-width, and the camber being substantially modified, thereby reducing the noise and the vibrations without changing the road-keeping qualities of the vehicle. Furthermore, as there is a break in continuity between the metal parts, an additional filtering of the residual vibrations is assured at the bearings and elastic stops, which increases the comfort of the vehicle. The life is increased as a result of the absence of the rubbing of metal parts with each other, and the manufacture is simpler which decreases the cost.

As goes without saying and as is, furthermore, evident from what has been stated above, the invention is in no way limited to the specific applications described or to the various specific parts which have been shown and described; rather, the invention covers all variations, particularly those in which the bearing 8 and/or the stops 10 and 11 are made of plastic or a semi-elastic material such as "Vulkollan," or in which the bearing 8 is formed of a plastic ball joint as in the embodiment illistrated in FIG. 9.

What is claimed is:

1. In a vehicle suspension including
   a vertically oscillating suspension element having a transverse axis at one end,
   a transverse pivot borne by the suspension element and coaxial with said transverse axis, a pendulum member connected to said transverse pivot and bearing the axle of a wheel of the vehicle, said pivot being arranged below said axle, and elastic stop means arranged between said suspension element and said pendulum member, the improvement comprising at least one bearing of a material having elastic properties within said suspension member and within which said pivot is supported, and the elastic stop means comprising a rod element and a rubber sleeve supporting and encircling said rod element, said rubber sleeve being carried by said pivot, and said rod element being radially positioned with respect to said pivot and rigidly fixed to said suspension element so as not only to limit the angular displacements of the pendulum member but also tending to maintain the axis of said pivot and said transverse axis coaxially aligned.

2. In a suspension according to claim 1, the further improvement of the pivot being rigidly connected directly to the pendulum member and said elastic bearing being formed of a cylindrical sleeve of rubber bonded to the pivot and to a rigid sleeve connected to the suspension element.

3. In a suspension according to claim 2, the improvement wherein said elastic stop means further comprises and additional elastic stop formed a rubber sleeve bonded in a hole formed in said pivot, and a rod element rigidly connected with the suspension element and bonded axially within said rubber sleeve, the axes of said rod elements disposed substantially at right angles to each other, and intersecting the axis of said pivot at a right angle.

4. In a suspension according to claim 1, the improvement of the vertically oscillating suspension element being formed of a longitudinal arm and a second pivot parallel to that of the pendulum member articulating said longitudinal arm on the frame of the vehicle.

* * * * *